(12) United States Patent
Kuvettu et al.

(10) Patent No.: US 10,137,438 B2
(45) Date of Patent: Nov. 27, 2018

(54) HYDROPROCESSING CATALYST COMPOSITION AND PROCESS THEREOF

(71) Applicant: INDIAN OIL CORPORATION LIMITED, Bandra (East), Mumbai (IN)

(72) Inventors: Mohan Prabhu Kuvettu, Haryana (IN); Kanthasamy Ramasubramanian, Haryana (IN); Alex Cheru Pulikottil, Haryana (IN); Kochappilly Ouseph Xavier, Haryana (IN); Mani Karthikeyan, Haryana (IN); Vinay Kumar Chaudhury, Haryana (IN); Brijesh Kumar, Haryana (IN); Santanam Rajagopal, Haryana (IN); Ravinder Kumar Malhotra, Haryana (JP)

(73) Assignee: Indian Oil Corporation Limited, Bandra (East) (IN)

( * ) Notice: Subject to any disclaimer, the term of this patent is extended or adjusted under 35 U.S.C. 154(b) by 348 days.

(21) Appl. No.: 14/766,287

(22) PCT Filed: Feb. 8, 2014

(86) PCT No.: PCT/IB2014/058868
§ 371 (c)(1),
(2) Date: Aug. 6, 2015

(87) PCT Pub. No.: WO2014/122620
PCT Pub. Date: Aug. 14, 2014

(65) Prior Publication Data
US 2015/0367332 A1    Dec. 24, 2015

(30) Foreign Application Priority Data
Feb. 9, 2013    (IN) .......................... 2282/MUM/2012

(51) Int. Cl.
| | | |
|---|---|---|
| *B01J 29/06* | (2006.01) | |
| *B01J 29/16* | (2006.01) | |
| *B01J 29/072* | (2006.01) | |
| *B01J 29/04* | (2006.01) | |
| *B01J 29/74* | (2006.01) | |
| *B01J 29/12* | (2006.01) | |
| *B01J 29/068* | (2006.01) | |
| *B01J 37/06* | (2006.01) | |
| *B01J 21/16* | (2006.01) | |
| *B01J 23/88* | (2006.01) | |

(Continued)

(52) U.S. Cl.
CPC ............ *B01J 29/166* (2013.01); *B01J 21/16* (2013.01); *B01J 23/88* (2013.01); *B01J 23/883* (2013.01); *B01J 23/888* (2013.01); *B01J 29/042* (2013.01); *B01J 29/043* (2013.01); *B01J 29/044* (2013.01); *B01J 29/045* (2013.01); *B01J 29/068* (2013.01); *B01J 29/072* (2013.01); *B01J 29/076* (2013.01); *B01J 29/084* (2013.01); *B01J 29/126* (2013.01); *B01J 29/146* (2013.01); *B01J 29/7407* (2013.01); *B01J 29/80* (2013.01); *B01J 35/109* (2013.01); *B01J 35/1057* (2013.01); *B01J 35/1061* (2013.01); *B01J 35/1066* (2013.01); *B01J 37/0201* (2013.01); *B01J 37/06* (2013.01); *B01J 2029/081* (2013.01); *B01J 2229/16* (2013.01); *B01J 2229/186* (2013.01); *B01J 2229/22* (2013.01); *B01J 2229/36* (2013.01); *B01J 2229/37* (2013.01); *B01J 2229/42* (2013.01)

(58) Field of Classification Search
CPC ........ B01J 21/16; B01J 29/084; B01J 29/146; B01J 29/166; B01J 29/076; B01J 29/068; B01J 29/072; B01J 29/042; B01J 29/043; B01J 29/044; B01J 29/045; B01J 29/126; B01J 29/7407; B01J 2229/16; B01J 2229/36; B01J 2229/37; B01J 2229/186; B01J 2229/42; B01J 35/1057; B01J 35/1061; B01J 35/109; B01J 2029/081
USPC ................ 502/64, 66, 68, 69, 74, 79, 81, 84
See application file for complete search history.

(56) References Cited

U.S. PATENT DOCUMENTS

| | | |
|---|---|---|
| 4,198,319 A | 4/1980 | Alafandi et al. |
| 5,055,176 A | 10/1991 | Herbst et al. |

(Continued)

FOREIGN PATENT DOCUMENTS

| | | |
|---|---|---|
| EP | 0403141 | 12/1990 |
| WO | WO 1988/06614 | 9/1988 |

OTHER PUBLICATIONS

PCT/IB2014/058868, dated Jun. 2, 2014, International Search Report and Written Opinion.

(Continued)

*Primary Examiner* — Elizabeth D Wood
(74) *Attorney, Agent, or Firm* — Workman Nydegger

(57) ABSTRACT

The present invention relates to a catalyst precursor composition comprising a first component having active sites, said first component being at least one of the surface modified clay and/or pore modified zeolite; and a second component being metal species comprising of at least one metal selected from Group VI B and at least one metal selected from VIII B and the second component is in intimate contact with the active sites of the first component. The present invention also provides a process for preparing the catalyst precursor composition. The present invention also relates to a catalyst composition and process of preparation thereof by using the catalyst precursor. More particularly, the present invention provides a catalyst composition suitable for converting hydrocarbon feeds to diesel range product.

14 Claims, No Drawings

(51) Int. Cl.
*B01J 23/883* (2006.01)
*B01J 23/888* (2006.01)
*B01J 29/08* (2006.01)
*B01J 29/14* (2006.01)
*B01J 35/10* (2006.01)
*B01J 37/02* (2006.01)
*B01J 29/076* (2006.01)
*B01J 29/80* (2006.01)

(56) References Cited

U.S. PATENT DOCUMENTS

| | | | |
|---|---|---|---|
| 5,997,729 A | 12/1999 | Itoh | |
| 6,528,447 B1 | 3/2003 | Ghosh et al. | |
| 2011/0100875 A1 | 5/2011 | Singh et al. | |
| 2012/0227584 A1* | 9/2012 | Wang | B01D 53/02 95/139 |
| 2013/0026070 A1* | 1/2013 | Oliveri | B01J 29/80 208/111.15 |

OTHER PUBLICATIONS

PCT/IB2014/058868, dated Mar. 30, 2015, International Preliminary Report on Patentability.

\* cited by examiner

HYDROPROCESSING CATALYST COMPOSITION AND PROCESS THEREOF

FIELD OF INVENTION

The present invention relates to a catalyst precursor composition comprising a first component having active sites, said first component being at least one of the surface modified clay and/or pore modified zeolite; and a second component being metal species comprising of at least one metal selected from Group VI B and at least one metal selected from VIII B and the second component is in intimate contact with the active sites of the first component. The present invention also provides a process for preparing the catalyst precursor composition. The present invention also relates to a catalyst composition and process of preparation thereof by using the catalyst precursor of the present invention. More particularly, the present invention provides a catalyst composition suitable for converting hydrocarbon feeds to diesel range product.

BACKGROUND OF THE INVENTION

U.S. Pat. No. 4,683,050 describes a catalyst composition for mild hydrocracking employing medium pore ZSM-5 zeolite. U.S. Pat. No. 4,735,928 relates to a hydrocracking catalyst from thermally treated and rare earth loaded faujasite zeolite. U.S. Pat. No. 4,756,822 describes a catalyst composition for hydrocracking employing boron substituted beta zeolite. U.S. Pat. No. 4,857,169 relates to a catalyst composition composed of a porous, inorganic refractory oxide in intimate combination with crystalline aluminosilicate Y zeolite.

U.S. Pat. No. 4,980,328 relates to a hydrocracking catalyst based on USY zeolite. U.S. Pat. No. 4,995,964 describes a mid-barrel catalyst based on rare earth pillard clay. U.S. Pat. No. 5,139,648 describes a hydrocarbon conversion process with pillard clay silica substituted alumina. U.S. Pat. No. 5,393,411 describes a hydrocarbon conversion process with fluorided beidellite clay and pillaring with rare earth, aluminium, ZrO, TiO$_2$, CrO, Al$_2$O$_3$. U.S. Pat. No. 5,614,453 refers to a hydrocracking catalyst based on beta zeolite and pillard clay. U.S. Pat. No. 6,251,261 describes a catalyst composition for hydrocracking employing clay and dioctahedral polysilicate.

In light of the above mentioned prior art processes there is a need to develop an improved catalyst for converting hydrocarbon feeds to diesel range fuel product.

SUMMARY OF THE INVENTION

Accordingly, the present invention provides a catalyst precursor composition which comprises:
a. a first component comprising active sites, said first component being at least one of the surface modified clay and/or pore modified zeolite; and
b. a second component being metal species comprising of at least one metal selected from Group VI B and at least one metal selected from Group VIII B,
wherein the second component is in intimate contact with the active sites of the first component.

The present invention also provides a process for preparing a catalyst precursor composition comprising:
a. a first component comprising active sites, said first component being at least one of the surface modified clay and/or pore modified zeolite; and
b. a second component being metal species comprising of at least one metal selected from Group VI B and at least one metal selected from Group VIII B,
wherein the second component is in intimate contact with the active sites of the first component; and said process comprises of treating the first component comprises at least one of clay and/or zeolite with a solvent comprising the second component.

The present provides a hydroprocessing catalyst composition comprising a catalyst precursor and a binder material wherein the catalyst precursor composition comprises:
a. a first component comprising active sites, said first component being at least one of the surface modified clay and/or pore modified zeolite; and
b. a second component being metal species comprising of at east one metal selected from Group VI B and at least one metal selected from Group VIII B,
wherein the second component is in intimate contact with the active sites of the first component; and the binder material is present in a range of 8 to 40% by weight of the catalyst composition.

The present invention also provides a process for preparing a hydroprocessing catalyst composition and said process comprises of admixing the catalyst precursor composition with a binder in presence of a mineral acid. In one aspect the hydroprocessing catalyst composition as prepared is shaped to extrudates.

The above and other aspects of the present invention are further attained and supported by the following embodiments described herein. However, the described embodiments are in accordance with the best mode of practice and the scope of the invention is not restricted to the described embodiments herein after.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternatives falling within the scope of the invention as defined by the appended claims.

The present invention pertains to a catalyst composition and a process for preparing the same. The catalyst herein is the hydroprocessing catalyst composition comprising a metal function material in close contact with an acid function. Further, the catalyst has accessibility of bulky hydrocarbons to the core of catalytic centers and employs an excess of metal function.

The present invention further relates to in-situ metal function hydroprocessing catalyst composition and a process for preparation thereof.

In an embodiment of the invention, catalyst composition is suitable for converting heavy hydrocarbon feeds to diesel range products under hydrocracking conditions.

According to the present invention, the metals used in the invention provides hydrogenation function to the catalyst and are selected from Group VIB metals like molybdenum, and tungsten; and Group VIIIB metals like iron, cobalt, rhodium, nickel, platinum and palladium.

According to the present invention, the acid function material is selected from various clays and faujasite type zeolite. In an embodiment of the invention the clay can be selected from group comprising kaolinite, bentonite, illite, vermiculite, smectite, montmorillonite, sepiolite and hectorite.

According to the invention, there is provided a process for preparing the catalyst comprising contacting metals with the acid function followed by mixing the resultant with an inorganic binder and extruded in to desired shape and calcined to form the finished catalyst. The acid function according to the invention comprises surface modified clay and micro-mesoporous zeolite.

According to the present invention, the inorganic binder is selected from group comprising pseudoboehmite alumina, aluminum trihydrate, colloidal silica and amorphous silica-alumina.

In an embodiment of the invention, there is provided a process for preparing the catalyst comprising contacting metals with the acid function followed by creating mesoporocity in both clay and zeolite components employing different procedures, incorporating the metal function by impregnating required metals into modified clay and zeolites, diluting these metal impregnated material with multifunction alumina, silica or both silica-alumina and shaping to desired form.

In the present invention, acid treated clay contains weak acid sites whereas acid treated zeolite and USY zeolite contain significant amount of strong bronsted acid sites on the surface. By impregnation of the support containing surface modified clay and zeolite before the addition of alumina binder, the metals are brought in to close vicinity of these bronsted acid sites thus facilitating both cracking and hydrogenation functions to take place more efficiently for the same reactant molecule.

The present invention further discloses the catalyst composition comprising of, (1) major amount of surface modified mesoporous clay, (2) minor amount of pore modified micro-mesoporous zeolite, both surface modified clay and pore modified zeolite impregnated with hydrogenation component selected from the group consisting of a Group VIB and Group VIIIB metals and mixtures thereof and (3) an inorganic binder selected from alumina, silica and silica-alumina.

In an embodiment of the invention, there is provided catalyst composition comprising tailored clay and micro-mesoporous zeolite.

According to the present invention, natural beneficiated or milled clay can be in finely divided form with a size below about 5 microns. Clay can have a two-layer structure having alternating sheets of silica in tetrahedral configuration and alumina in octahedral configuration. These sheets are separated with a gap of 7.13 Å. Dry atmosphere equilibrated clay has moisture content of about 15 wt %. The clay is a good source for silica and alumina with about 45 wt % of silica and 38 wt % of alumina with empirical formula $2SiO_2$—$Al_2O_3.2H_2O$. Clay possesses surface area in the range 10-20 $m^2/g$ and as such does not have any catalytic activity.

According to the present invention, this clay has been transformed to porous mild acidic material through high temperature calcination between 500° C. to 1000° C. followed by controlled mineral acid leaching, wherein the acid source is selected from group comprising hydrochloric acid, nitric acid, sulphuric acid, hydrofluoric acid, phosphoric acid and their mixture, Calcined clay on further acid leaching produce pores in the range 40-1000 Å with mild acidity accessible to large hydrocarbon molecules suitable for cracking to diesel range molecules.

The zeolites are synthetic or naturally occurring crystalline inorganic material characterized by properties such as ion exchange and molecular sieving. Some members of zeolite family employed in the present invention are large pore crystalline material such as faujasite, zeolite A and zeolite X type with pore opening in the range 3-13.5 Å.

As per the invention, faujasite, zeolite A and zeolite X type with low residual content re reacted with mineral acid selected from group comprising Hydrochloric acid, Nitric acid, Sulphuric acid, Hydrofluoric acid, Phosphoric acid and their mixture for creation of additional pores in the range 40-1000 Å. As some of the zeolites are highly susceptible to strong acids, mild acidic conditions at low temperature ranging from 5° C. to 80° C. have been employed for creation of mesoporosity. It is preferred to employ temperature between 5° C. to 30° C. for acid sensitive zeolites. As the zeolites employed have silica to alumina ratio between 2 to 10 with high framework alumina concentration possess high acidity. Acid leaching under controlled pH and temperature, results in carving out proportional amount of framework silica alumina thereby leaving behind mesoporous zeolite with more or less unaltered silica to alumina ratio. Both leached clay and zeolites were either individually or as a mixture impregnated with required metal function sourced from salts of metals such as nickel, molybdenum, tungsten, cobalt, rhodium, platinum and silver. These metals can be loaded ranging from 1 to 3 wt % of leached clay and zeolitic material, metal weight calculated on oxide basis.

According to the present invention, Pseudoboehmite alumina, aluminum trihydrate, colloidal silica, amorphous silica-alumina can be employed for diluting tailored cracking components and final catalyst can be shaped to any required form. On calcination followed by sulphidation, the material works as an effective catalyst for cracking of heavy hydrocarbons present in feed, under hydrocracking conditions.

Accordingly the present invention provides a catalyst precursor composition comprising:

a. a first component comprising active sites, said first component being at least one of the surface modified clay and/or pore modified zeolite; and b. a second component being metal species comprising of at least one metal selected from Group VI B and at least one metal selected from VIII B, wherein the component is in intimate contact with the active sites of the first component.

According to present invention the first component has active sites which provide acidic function e catalyst for activating hydrocracking reactions. In addition, the first component provides specified pore size necessary for the desired performance according to current invention.

In one embodiment of the present invention, the metal species are metal clusters of oxides of specified elements, which are selected from Group VI B and Group VIII B or their mixtures.

In one embodiment of the present invention, the second component of the catalyst precursor composition is present in an amount of 1 to 30 wt % of the total weight of the catalyst precursor composition.

In one embodiment of the present invention, the second component of the catalyst precursor composition is present in an amount of 5 to 2.5 wt % of the total weight of the catalyst precursor composition.

In one embodiment of the present invention, the second component of the catalyst precursor composition is present in an amount of 10 to 20 wt % of the total weight of the catalyst precursor composition.

In another embodiment of the present invention, the ratio of Group VIII B metal to total metal component comprising both Group VIB and VIIIB metals is from 0.1:1 to 0.5:1.

According to present invention, the first component provides a support system into which the second component (metal) is incorporated as a solution. Generally, the second component is present in the range of 15 to 20 wt % of first component in the catalyst depending on the porosity of first component, the support. Excessive loading of metal will lead to blockage of porosity and reduction of catalytic activity. Further, only a balanced amount of metal sites is required for achieving optimum performance of the catalyst. Hence, preferably loading of second component (metal) is controlled in the order of about 20% of first component.

In yet another embodiment of the present invention, the first component of catalyst precursor composition comprises both the surface modified clay and the pore modified zeolite.

According to present invention, the metal loading in clay and zeolite is estimated roughly based on the pore volume of these materials, assuming that the pores are completely filled by the metal solution during impregnation. On this basis, the clay component is believed to have 7.5% and zeolite to have 12.5% metal loading (total metal loading of 20%) of the total weight of the support.

In another embodiment of the present invention, the metal loading on the surface modified clay is in the range of 1 to 30%, preferably in the range of 2 to 20% and more preferably in the range of 5 to 10%.

In yet another embodiment of the present invention, the metal loading on the pore modified zeolite is in the range of 1 to 50%, preferably in the range of 5 to 30% and more preferably in the range of 10 to 20%.

In one embodiment of the present invention, the ratio by weight of the surface modified clay to the pore modified zeolite present in the catalyst precursor composition is in the range of 1:1 to 9:1.

In another embodiment of the present invention, the ratio by weight of the surface modified clay to the pore modified zeolite present in the catalyst precursor composition is in the range of 1.5:1 to 6:1.

In another embodiment of the present invention, the ratio by weight of the surface modified clay to the pore modified zeolite present in the catalyst precursor composition is in the range of 2:1 to 4:1.

In one embodiment of the present invention, the first component comprises the major amount of surface modified clay and the minor amount of pore modified zeolite.

In another embodiment of the present invention, for any given amount of pore modified zeolite in the first component, the remaining portion comprising of clays is a mixture of surface modified clay and normal clay. In such case, the composition of the surface modified clay in the overall clay component in the catalyst is from 50-100 wt %.

In another embodiment of the present invention for any given amount of surface modified clay in the first component, the remaining portion comprising of zeolites is a mixture of pore modified zeolite and normal zeolite. In such case, the composition of the pore modified zeolites in the overall zeolites content of the catalyst is from 50-100 wt %.

In yet another embodiment of the present invention, the total mount of clay component in the first component of the overall catalyst composition is from 50-90%, preferably 50-80% more preferably 50-70% by weight and the total amount of zeolites component in the first component of the overall catalyst composition can vary from 10-50%, preferably 20-50% and more preferably 30-50% by weight.

According to present invention the clay that can be surface modified may include kaolinite, bentonite, illite, vermiculite, smectite, montmorillonite, sepiolite and hectorite. More preferably Kaolinite based clay is used.

In one embodiment of the present invention, the average pore size in the surface modified clay is in the range of 40-1000 Å, preferably in the range of 40-500 Å and more preferably in the range of 40-300 Å. The surface modified clay having mesopores with an average diameter in the range of 40 to 1000 Å.

According to present invention the surface modification of clay was carried out to increase the pore size and surface area thereby increase the cracking ability of the materials to form diesel range molecules. As per the current invention, pore size of 80 Å and surface area 110 m$^2$/g was created by modifying the clay which had an initial pore size of 20 Å and surface area 10 m$^2$/g. Pore size of 80 Å is the optimum range for enhanced middle distillate formation.

In one embodiment of the present invention, the average pore size in the pore modified zeolite is in the range of 40-1000 Å, preferably in the range of 40-600 Å and more preferably in the range of 40-200 Å. The zeolite having primary pores and secondary pores, said primary pores having an average pore diameter in the range of 3 to 13.5 Å and said secondary pores having an average pore diameter in the range of 40 to 1000 Å.

According to present invention the large pore crystalline zeolites such as faujasite, zeolite A and zeolite X type with pore opening in the range 3-13.5 Å is used for making the hydrocracking catalyst precursors. Faujasite zeolites in particular zeolite Y is the most preferred support for hydrocracking catalyst because of its high acidity and pore characteristics.

According to present invention the zeolites before pore modification contain majority of the pores less than 20 Å. Zeolites are treated with chemicals to create mesopores. The mesopores can range anywhere between 40-1000 Å. The mesopores created in the current invention range from 40-200 Å. High degree of mesopores in the current invention resulted in improved accessibility for cracking larger hydrocarbons to diesel range molecules.

According to present invention, the ratio of surface modified clay to pore modified zeolite is maintained in such a way that controlled cracking takes place to result the formation of more middle distillates. The presence of higher amount of pore modified zeolite leads to higher degree of cracking that may result in the formation of more naphtha and hence reduced middle distillate selectivity. Accordingly, as per the current invention, the catalyst composition should compose major amount of surface modified clay and a minor amount of pore modified zeolite. As per example 10 the ratio of surface modified clay to pore modified zeolite is 2:1 and generally the ratio is between 1.5:1-9.0:1.

The present invention also provides a process for preparing a catalyst precursor composition comprising:
a. a first component comprising active sites, said first component being at least one of the surface modified clay and/or pore modified zeolite, and
b. a second component being metal species comprising of at least one metal selected from Group VI B and at least one metal selected from VIII B;

wherein the second component is in intimate contact with the active sites of the first component, and said process comprising of treating a first component comprising at least one of clay and/or zeolite with a solution comprising a second component, the second component comprising of at least one metal selected from Group VI B and at least one metal selected from Group VIII B.

The present invention also provides a hydroprocessing catalyst composition comprising a catalyst precursor and a binder material, wherein the catalyst precursor composition comprises:

a. a first component comprising active sites, said first component being at least one of the surface modified clay and/or pore modified zeolite, and b. a second component being metal species comprising of at east one metal selected from Group VI B and at least one metal selected from Group VIII B, wherein the second component is in intimate contact with the active sites of the first component; and the binder material is present in a range of 8 to 40% by weight, preferably from 12 to 32% by weight and more preferably 16 to 24% by weight of the catalyst composition.

In one embodiment of the present invention, the binder material is present in a range of 5 to 50% by weight, preferably in the range of 10 to 40% by weight, and more preferably in the range of 20 to 30% by weight of the first component.

According to present invention, the catalyst precursor composition is shaped to any desired form such as pellets, extrudates, etc. and binder is used to provide sufficient mechanical strength for the particles. Addition of excess of binder than the optimum amount generally results in the dilution of active component leading to loss of activity. A minimum of 25% of the binder is used for obtaining desired particles of the catalyst. However in some cases even higher amounts like 50% of the binder is added for adjusting the concentration of active component, as the binder can also act as inert filler.

According to present invention, clay and zeolite constitute the active components of the current invention which are responsible for the catalytic performance. Binder is used in the last step to shape the catalyst or as a filler and does not play any role in the catalytic function.

The present invention also provides a process for preparing a hydroprocessing catalyst composition and said process comprising of admixing the said catalyst precursor composition with binder in presence of a mineral acid and shaping to extrudates.

Following examples further illustrate the present invention without scope of the invention:

Example 1

100 gm of 37% hydrochloric acid was diluted with 300 g n of hot DM water. 100 gm of calcined (at 900° C. for one hour) normal kaolin clay having particle size more than 80% in the range of 0.3-0.8 microns was added to this dilute acid and the mixture was kept under stirring and maintained at 95° C. for 4 hrs. At the end, the aluminum depicted kaolin clay was recovered by filtration, washed repeatedly with DM water to completely remove chloride and dried at 120° C. for 12 hours. The surface modified kaolin clay thus prepared had a surface area of 110 m$^2$/g and an average pore diameter of 80 Å and is ready for use in hydrocracking catalyst formulation.

Example 2

Hydrothermally stable NaY zeolite was taken as the starting zeolite. 500 gms of this zeolite having a unit cell size (UCS) 24.59 Å was exchanged with 10% ammonium sulfate solution, maintaining solid:liquid ratio 1:10, temperature 80° C. for 3 hrs. The exchange step was repeated 2 times more with freshly prepared ammonium sulfate solution each time. The exchanged zeolite was filtered and adequately washed to remove sulfate ions and dried at 120° C. for 16 hours. The exchanged zeolite was then subjected to 100% steam at 700° C. for 1 hr to obtain ultra stabilized Y zeolite (USY) with a UCS of 24.28 Å, crystallinity of 60% and surface area of 560 m$^2$/g and is ready for use in hydrocracking catalyst formulation.

Example 3

The zeolite prepared after three exchanges as in example 2 was then reacted with mineral acid (5%) sourced from hydrochloric acid for creation of additional pores in the range 40-1000 Å. As some of the zeolites are highly susceptible to strong acids, mild acidic conditions at temperature 50° C. for 3 his were employed for creation of mesoporosity.

Example 4: Catalyst A

This example describes the process for preparation of hydrocracking catalyst A using surface modified kaolin clay and USY zeolite prepared as per example 1 and example 2, respectively. 25 g of Surface modified Kaolin clay and 25 g USY zeolite were physically mixed and ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 25% surface modified kaolin clay, 25% USY zeolite and 50% pseudoboehmite alumina. 2 g of nitric acid (70% concentration) was diluted in 60 ml DM water and this was added to the blended mixture. This was then made into semi solid mixture using a mortar and pestle. The final semi solid mixture was shaped in to cylindrical extrudates. These extrudates were dried at 120° C. for 16 hrs and calcined at 500° C. for 3 hrs to produce catalyst A. The final shaped catalyst contained 2.5% Ni and 7.5% W. The calcined catalyst upon sulphidation, was ready for cracking of heavy hydrocarbons present in feed, under hydrocracking conditions.

Example 5: Catalyst B

This example describes the process for preparation of hydrocracking catalyst B using surface modified kaolin clay and mesoporous zeolite prepared as per example 1 and example 3, respectively. 25 g of surface modified kaolin clay and 25 g mesoporous zeolite was physically mixed and ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 25% surface modified kaolin clay, 25% mesoporous zeolite and 50% pseudoboehmite alumina. 2 g of nitric acid (70% concentration) was diluted in 60 ml DM water and this was added to the blended mixture. This was made into semi solid mixture using a mortar and pestle. The final semi solid mixture was then shaped in to cylindrical extrudates. These extrudates were dried at 120° C. for 16 hrs and calcined at 500° C. for 3 hrs to produce catalyst B. The final shaped catalyst contained 2.5% Ni and 7.5% W. The calcined catalyst upon sulphidation, was ready for cracking of heavy hydrocarbons present in feed, under hydrocracking conditions.

Example 6: Catalyst C

This example describes the process for preparation of hydrocracking catalyst C using surface modified kaolin clay as per example 1, normal kaolin clay and mesoporous zeolite as per example 3. 25 g of surface modified kaolin clay, 25 g of normal kaolin clay and 25 g of mesoporous zeolite were physically mixed and ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 25% surface modified kaolin clay, 25% normal kaolin clay, 25% mesoporous zeolite and 25% pseudoboehmite alumina. 2 g of nitric acid (70% concentration) was diluted in 60 ml DM water and this was added to the blended mixture. This was made into semi solid mixture using a mortar and pestle. The final semi solid mixture was shaped in to cylindrical extrudates. These extrudates were dried at 120° C. for 16 hrs and calcined at 500° C. for 3 hrs to produce catalyst C. The final shaped catalyst contained 2.5% Ni and 7.5% W. The calcined catalyst upon sulphidation, was ready for cracking of heavy hydrocarbons present in feed, under hydrocracking conditions.

Example 7: Catalyst D

This example describes the process for preparation of hydrocracking catalyst D using surface modified kaolin clay as per example 1, normal kaolin clay and USY zeolite as per example 2. 25 g of surface modified kaolin clay, 25 g of normal kaolin clay and 25 g of USY zeolite were physically mixed and ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 25% surface modified kaolin clay, 25% normal kaolin clay, 25% USY zeolite and 25% pseudoboehmite alumina. 2 g of nitric acid (70% concentration) was diluted in 60 ml DM water and this was added to the blended mixture. This was made into semi solid mixture using a mortar and pestle. The final semi solid mixture was shaped in to cylindrical extrudates. These extrudates were dried at 120° C. for 16 hrs and calcined at 500° C. for 3 hrs to produce catalyst D. The final shaped catalyst contained 2.5% Ni and 7.5% W. The calcined catalyst upon sulphidation, was ready for cracking of heavy hydrocarbons present in feed, under hydrocracking conditions.

Example 8: Catalyst E

This example describes the process for preparation of hydrocracking catalyst E. 25 g of surface modified kaolin clay as per example 1, 25 g of USY as per example 2 and 25 g of mesoporous zeolite as per example 3 were physically mixed and ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 25% surface modified kaolin clay, 25% USY zeolite, 25% mesoporous zeolite and 25% pseudoboehmite alumina. 2 g of nitric acid (70% concentration) was diluted in 60 ml DM water and this was added to the blended mixture. This was made into semi solid mixture ng a mortar and pestle. The final semi solid mixture was shaped in to cylindrical extrudates. These extrudates were dried at 120° C. for 16 hrs and calcined at 500° C. for 3 hrs to produce catalyst E. The final shaped catalyst contained 2.5% Ni and 7.5% W. The calcined catalyst upon sulphidation, was ready for cracking of heavy hydrocarbons present in feed, under hydrocracking conditions.

Example 9: Catalyst F

This example describes the process for preparation of hydrocracking catalyst F using the conventional procedure where in the metal impregnation was carried out on a pre shaped support to indicate the high metal function utilization by the catalyst prepared by the current invention. 25 g of surface modified kaolin clay and 25 g of mesoporous zeolite prepared as per example 1 and example 3, respectively were physically mixed and ball milled for 1 hr to make in to fine powder. The clay zeolite composite was pulverized and blended with 50 g pseudoboehmite alumina on volatile basis. The final mixture contained 25% surface modified kaolin clay, 25% mesoporous zeolite and 50% pseudoboehmite alumina. 2 g of nitric acid (70% concentration) was diluted in 60 ml DM water and this was added to the blended mixture. This was made into semi solid mixture using a mortar and pestle. The final semi solid mixture was shaped in to cylindrical extrudates. These extrudates were dried at 120° C. for 16 hrs and calcined at 500° C. for 3 hrs. The calcined extrudates were then impregnated with 5 g of nickel nitrate and 5.4 g ammonium tungstate by incipient wet impregnation technique. The impregnated extrudates were dried at 120° C. overnight and calcined at 500° C. for 3 hrs to produce catalyst F. The final catalyst contained 2.5% Ni and 7.5% W. The calcined catalyst upon sulphidation, was ready for cracking of heavy hydrocarbons present in feed, under hydrocracking conditions.

Example 10: Catalyst G

This example describes the process for preparation of hydrocracking catalyst G using major amount of surface modified kaolin clay and minor amount of mesoporous zeolite prepared as per example 1 and example 3, respectively. 50 g of surface modified clay and 25 g of mesoporous zeolite was physically mixed and ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 50% surface modified kaolin clay, 25% mesoporous zeolite and 25% pseudoboehmite alumina. 2 g of nitric acid (70% concentration) was diluted in 60 ml DM water and this was added to the blended mixture. This was made into semi solid mixture using a mortar and pestle. The final semi solid mixture was then shaped in to cylindrical extrudates. These extrudates were dried at 120° C. for 16 hrs and calcined at 500° C. for 3 hrs to produce catalyst G. The final shaped catalyst contained 2.5% Ni and 7.5% W. The calcined catalyst upon sulphidation, was ready for cracking of heavy hydrocarbons present in feed, under hydrocracking conditions.

Example 11: Catalyst H

This example describes the process for preparation of hydrocracking catalyst H containing major amount of surface modified kaolin clay and minor amount of mesoporous zeolite using the conventional procedure where in the metal impregnation was carried out on a pre shaped support to indicate the high metal function utilization by the catalyst prepared by the current invention. 50 g of surface modified clay and 25 g of mesoporous zeolite prepared as per example 1 and example 3, respectively were physically mixed and ball milled for 1 hr to make in to fine powder. The clay zeolite composite was pulverized and blended with 25 g of pseudoboehmite alumina on volatile basis. The final mixture contained 50% surface modified clay, 25% mesoporous zeolite and 25% pseudoboehmite alumina. 2 g of nitric acid (70% concentration) was diluted in 60 ml DM water and this was added to the blended mixture. This was made into semi solid mixture using a mortar and pestle. The final semi solid mixture was shaped in to cylindrical extrudates. These extrudates were dried at 120° C. for 16 hrs and calcined at 500° C. for 3 hrs. The calcined extrudates were then impregnated with 5 g of nickel nitrate and 5.4 g ammonium tungstate by incipient wet impregnation technique. The impregnated extrudates were dried at 120° C. overnight and calcined at 500° C. for 3 hrs to produce catalyst H. The final catalyst contained 2.5% Ni and 7.5% W. The calcined catalyst upon sulphidation, was ready for cracking of heavy hydrocarbons present in feed, under hydrocracking conditions.

Example 12: Catalyst I

This example describes the process for preparation of hydrocracking catalyst 1 using normal kaolin clay and mesoporous zeolite. 25 g of normal clay and 25 g of mesoporous zeolite were physically mixed and ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 25% normal kaolin clay, 25% mesoporous zeolite and 50% pseudoboehmite alumina. 2 g of nitric acid (70% concentration) was diluted in 60 ml DM water and this was added to the blended mixture. This was made into semi solid mixture using a mortar and pestle. The final semi solid mixture was then shaped in to cylindrical extrudates. These extrudates were dried at 120° C. for 16 hrs and calcined at 500° C. for 3 hrs to produce catalyst I. The final shaped catalyst contained 2.5% Ni and 7.5% W. The calcined catalyst upon sulphidation, was ready for cracking of heavy hydrocarbons present in feed, under hydrocracking conditions.

Example 13: Catalyst J

This example describes the process for preparation of hydrocracking catalyst j using normal kaolin clay and USY zeolite. 25 g of normal clay and 25 g of USY zeolite were physically mixed and ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 25% normal kaolin clay, 25% USY zeolite and 50% pseudoboehmite alumina. 2 g of nitric acid (70% concentration) was diluted in 60 ml DM water and this was added to the blended mixture. This was made into semi solid mixture using a mortar and pestle. The final semi solid mixture was then shaped in to cylindrical extrudates. These extrudates were dried at 120° C. for 16 hrs and calcined at 500° C. for 3 hrs to produce catalyst J. The final shaped catalyst contained 2.5% Ni and 7.5% W. The calcined catalyst upon sulphidation, was ready for cracking of heavy hydrocarbons present in feed, under hydrocracking conditions.

Example 14: Catalyst K

This example describes the process for preparation of hydrocracking catalyst by using only surface modified kaolin clay as first component. 50 g of surface modified clay was ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with 50 g of pseudoboehmite alumina on volatile basis. The final mixture contained 50% surface modified kaolin clay and 50% pseudoboehmite alumina. 2 g of nitric acid (70% concentration) was diluted in 60 ml DM water and this was added to the blended mixture. This was made into semi solid mixture using a mortar and pestle. The final semi solid mixture was then shaped in to cylindrical extrudates. These extrudates were dried at 120° C. for 16 hrs and calcined at 500° C. for 3 hrs to produce catalyst K. The final shaped catalyst contained 2.5% Ni and 7.5% W. The calcined catalyst upon sulphidation, was ready for cracking of heavy hydrocarbons present in feed, under hydrocracking conditions.

Example 15: Catalyst L

This example describes the process for preparation of hydrocracking catalyst using only mesoporous zeolite as first component. 50 g of mesoporous zeolite was ball milled for 1 hr to make in to fine powder. The fine mixture was then impregnated with 5 g of nickel nitrate and 5.4 g ammonium tungstate for loading 5% nickel and 15% tungsten by incipient wet impregnation technique. The impregnated mixture was dried at 120° C. overnight. The nickel tungsten loaded clay zeolite composite was pulverized and blended with pseudoboehmite alumina on volatile basis. The final mixture contained 50% mesoporous zeolite and 50% pseudoboehmite alumina. 2 g of nitric acid (70% concentration) was diluted in 60 ml DM water and this was added to the blended mixture. This was made into semi solid mixture using a mortar and pestle. The final semi solid mixture was then shaped in to cylindrical extrudates. These extrudates were dried at 120° C. for 16 hrs and calcined at 500° C. for 3 hrs to produce catalyst L. The final shaped catalyst contained 2.5% Ni and 7.5% W. The calcined catalyst upon sulphidation, was ready for cracking of heavy hydrocarbons present in feed, under hydrocracking conditions.

Example 16: Activity Evaluation of the Catalysts

The catalytic activity was evaluated using a high pressure, isothermal, fixed bed micro reactor (Xytel, India) operating in a down flow mode. 5 cc of the catalyst is packed after dilution with inactive carborundum particles in order to minimize channeling and to maintain a plug flow. Prior to the reaction the catalyst was sulfided with a straight run gas oil feed doped with 5% Dimethyl disulfide (DMDS). After the completion of the sulfidation, hydrotreated vacuum gas oil (VGO) feed was charged in to the reactor at the operating conditions. Sample collection was done after achieving a steady state. The hydrocracking activity testing was performed under the conditions shown in Table 1. The product samples were analyzed for N and Simulated distillation. In order to compare the relative performance of the catalysts in terms of middle distillate yield, the conversion was maintained at 70% for all the catalysts. The results of the middle distillate yield of the catalyst samples are given in Table 2.

TABLE 1

Catalyst testing conditions

| Parameters | Conditions | |
|---|---|---|
| | Pre-sulfidation | Reaction |
| $H_2$ pressure (Bar) | 109 | 109 |
| $H_2$/Oil ratio ($Nm^3/m^3$) | 1315 | 1300 |
| LHSV ($h^{-1}$) | 2 | 1.33 |
| Temperature (° C.) | 310 | 315 |

TABLE 2

Catalyst Performance Data:

| Catalyst ID | Total middle distillates (%) |
|---|---|
| A | 30 |
| B | 47 |
| C | 35 |
| D | 30 |
| E | 39 |
| F | 37 |
| G | 55 |
| H | 42 |
| I | 35 |
| J | 23 |
| K | 15 |
| L | 20 |

The table 2 provides a catalyst performance data catalysts A to L as defined in above examples 4 to 15.

We claim:
1. A catalyst precursor composition comprising:
   a. a first component comprising active sites, said first component being a surface modified clay and a pore modified zeolite, and
   b. a second component being metal species comprising of at least one metal selected from Group VI B and at least one metal selected from VIII B;
   wherein the second component is in intimate contact with the active sites of the first component;
   wherein the surface modified clay is obtained by calcination at a temperature in the range of 500° C. to 1000° C., followed by controlled acid leaching of a kaolin clay and the pore modified zeolite is obtained by controlled acid leaching of a faujasite zeolite.

2. The catalyst precursor composition as claimed in claim 1, wherein the second component is present in an amount of 1 to 30 wt %, of the total weight of the catalyst precursor composition.

3. The catalyst precursor composition as claimed in claim 2, wherein the second component is present in an amount of 5 to 25 wt % of the total weight of the catalyst precursor composition.

4. The catalyst precursor composition as claimed in claim 2, wherein the second component is present in an amount of 10 to 20 wt % of the total weight of the catalyst precursor composition.

5. The catalyst precursor composition as claimed in claim 1, wherein the ratio of Group VIII B metal to total metal component comprising both Group VIB and VIIIB metals is from 0.1:1 to 0.5:1.

6. The catalyst precursor composition as claimed in claim 1, wherein the ratio by weight of the surface modified clay to the pore modified zeolite is in the range of 1:1 to 9:1.

7. The catalyst precursor composition as claimed in claim 1, wherein the ratio by weight of the surface modified clay to the pore modified zeolite is in the range of 1.5:1 to 6:1.

8. The catalyst precursor composition as claimed in claim 1, wherein the ratio by weight of the surface modified clay to the pore modified zeolite is in the range of 2:1 to 4:1.

9. The catalyst precursor composition as claimed in claim 1, wherein the first component comprises a major amount of the surface modified clay and a minor amount of the pore modified zeolite.

10. The catalyst precursor composition as claimed in claim 1, wherein the surface modified clay have mesopores with an average diameter in the range of 40 to 1000 Å.

11. The catalyst precursor composition as claimed in claim 1, wherein the zeolite have primary pores and secondary pores, said primary pores having an average pore diameter in the range of 3 to 13.5 Å and said secondary pores having an average pore diameter in the range of 40 to 1000 Å.

12. A process for preparing a catalyst precursor composition as claimed in claim 1, said process comprising treating said first component with a solution comprising said second component.

13. A hydroprocessing catalyst composition comprising: a catalyst precursor composition as claimed in claim 1 and a binder material, wherein the binder material is present in the range of 8 to 40% by weight of the catalyst composition.

14. A process for preparing a hydroprocessing catalyst composition, said process comprising of admixing a catalyst precursor composition of claim 1 with a binder in presence of a mineral acid and shaping to extrudates.

* * * * *